Aug. 14, 1945.  S. W. GILBERT  2,382,050
CARBURETOR
Filed July 30, 1943
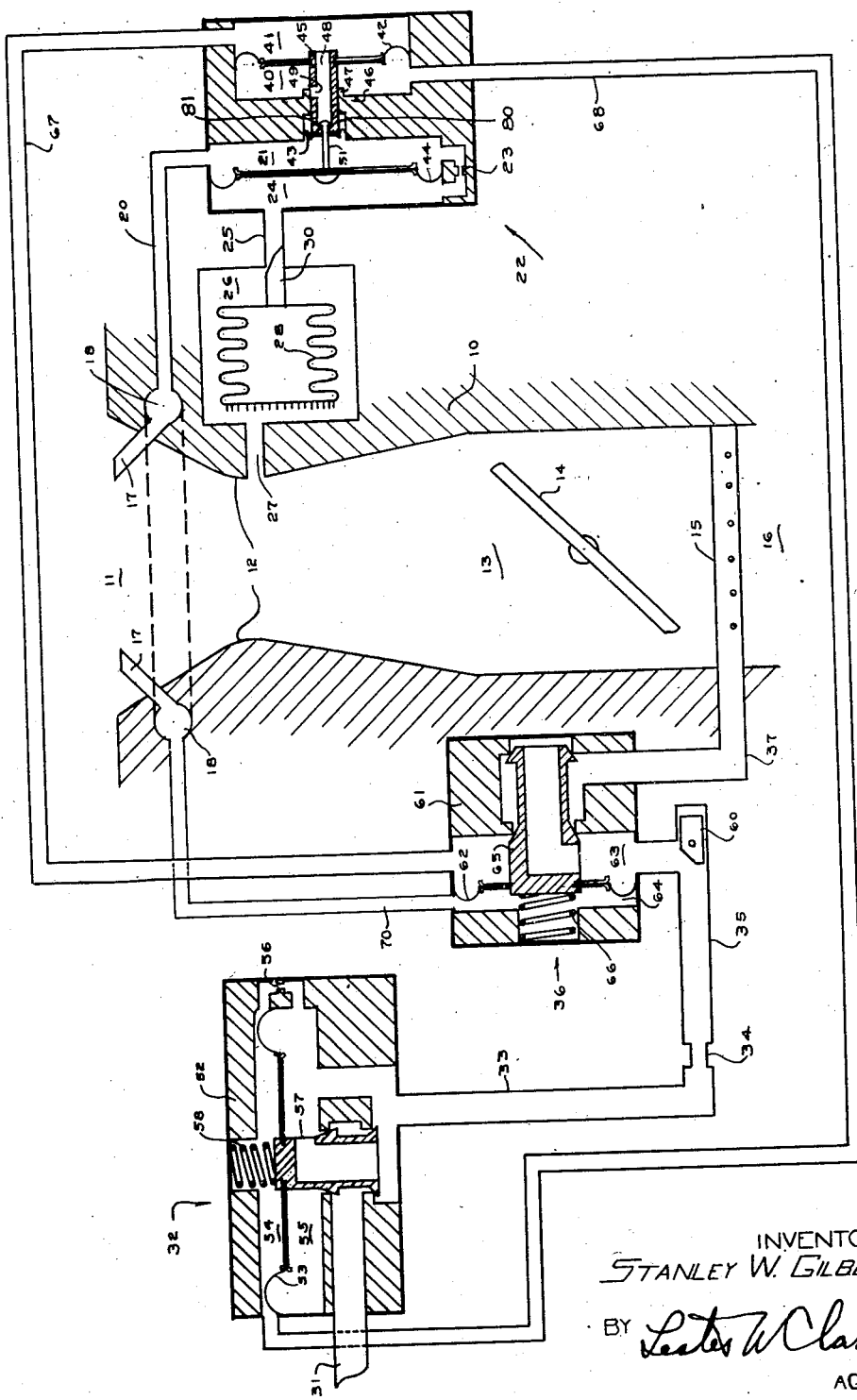
INVENTOR
STANLEY W. GILBERT
BY Lester W Clark
AGENT Patented Aug. 14, 1945

2,382,050

UNITED STATES PATENT OFFICE 2,382,050

CARBURETOR

Stanley W. Gilbert, Middletown, Conn., assignor to Chandler-Evans Corporation, South Meriden, Conn., a corporation of Delaware Application July 30, 1943, Serial No. 496,750

1 Claim. (Cl. 261—39)

This invention relates to flow controlling devices, and especially to such devices as are adapted for use in carburetors for internal combustion engines.

In carburetors adapted for use on aircraft engines, the fuel flow is sometimes proportioned to the air flow by measuring the air and fuel flows and operating the fuel regulator valve in accordance with the balance between the measured air and fuel flows.

It is an object of the present invention to provide an improved device for measuring and comparing two fluid flows.

A further object of the present invention is to provide improved means for measuring and comparing the fuel and air flows in a carburetor for an internal combustion engine.

A further object is to provide an improved valve structure which responds to the difference between two differential pressures. A still further object is to provide such a device in which the two differential pressures are measured by flexible diaphragms connected to the valve.

Another object of the present invention is to provide improved flow measuring and controlling means of the type described in the co-pending application of Milton E. Chandler, Serial No. 493,071, filed July 1, 1943.

Other objects and advantages of the present invention will become apparent from a consideration of the appended specification, claim and drawing, in which The single figure represents, somewhat diagrammatically, a carburetor for an internal combustion engine embodying my invention.

Referring to the drawing, there is shown a portion 10 of the main body of the carburetor. Air flows thru the carburetor from an inlet 11 thru a venturi restriction 12 and a passage 13, past a throttle 14 and a fuel discharge nozzle 15 to an outlet 16.

A second air passage connects the inlet 11 and the throat of the venturi 12. The second air passage may be traced from the inlet 11 thru a number of impact tubes 17, whose open ends are exposed to the incoming air, a vent ring 18 which interconnects the impact tubes 17, a conduit 20, an expansible chamber 21 in a pressure meter 22, a restriction 23, an expansible chamber 24 in the pressure meter 22, a conduit 25, a chamber 26 and a conduit 27 to the throat of venturi 12.

A flexible bellows 28 is mounted in the chamber 26, and operates a valve 30 which controls the flow of air from the conduit 25 into the chamber 26. The bellows 28 is filled with nitrogen or other temperature responsive fluid, so that the valve 30 is positioned as a function of the pressure and temperature, and hence of the density of the air in chamber 26.

The valve 30 controls the flow of air thru the second passage previously described in such a manner that the pressure differential established between chambers 21 and 24 is an accurate measure of the quantity of air passing thru the main air passage 13. The valve 30 compensates for variations in the pressure differentials between the inlet 11 and the throat of venturi 12 due to changes in density in the air, and also compensates for errors due to the inherent limitations of the venturi as a fluid meter.

The fuel passing thru the carburetor comes from a fuel pump or other suitable source of fuel under pressure (not shown) and passes thru a conduit 31, a fuel regulator unit 32, a conduit 33, a metering restriction 34, a conduit 35, a pressure regulator 36, and a conduit 37 to the discharge nozzle 15.

The pressure meter 22 includes, in addition to the chambers 21 and 24, a pair of expansible chambers 40 and 41, separated by a flexible diaphragm 42. A flexible diaphragm 44 separates the chambers 21 and 24. The diaphragms 42 and 44 are suitably attached to a valve member 45. A stationary transverse wall 46 extends across the chamber 40, and is provided near its center with a guide and seat member 47. The member 47 cooperates with the valve member 45 to guide its movements. The valve 45 has a passage 48 extending thru its center, and a lateral passage 49 which extends radially outward thru the valve member 45 from passage 48. The seat member 47 cooperates with the passage 49 so as to open or close the latter to a greater or less extent depending upon the position of valve member 45. A sealing diaphragm 43 connects the valve member 45 and the wall 46 at a point spaced from the guide member 47, thereby forming a small chamber 80. The chamber 80 is connected thru a passage 81 with the passage 48 extending thru the valve member 45.

The diaphragm 44 is attached to the valve member 45 by a flexible wire or cable 51.

The fuel regulator 32 includes a housing 52 whose interior is separated by a flexible diaphragm 53 into expansible chambers 54 and 55. The chambers 54 and 55 are interconnected thru a restriction 56 and the chamber 55 is connected to the outlet conduit 33. The diaphragm 53 carries at its center a valve 57, which is balanced against inlet pressure. A compression spring 58 biases the valve 57 toward open position.

An idle valve, suitably connected by means not shown to the throttle 14, operates to restrict the conduit 35 when the throttle is closed or nearly closed.

The pressure regulator 36 includes a casing 61, whose interior is separated by diaphragm 62 into expansible chambers 63 and 64. The diaphragm 62 carries at its center a valve 65, which is balanced against outlet pressure, and which is biased toward closed position by a compression spring 66.

Operation

As previously described, the pressure differential between chambers 21 and 24 is a measure of the quantity of air flowing thru the passage 13. The pressure differential between chambers 40 and 41, on the other hand, is a measure of the quantity of fuel flowing thru the metering restriction 34. The pressure in chamber 41 is the same as that on the downstream side of restriction 34, since chamber 41 is connected thru a conduit 67 to the chamber 63 of the pressure regulator 36. The pressure in chamber 40 is the same as that in chamber 54 of the fuel regulator 32 since these two chambers are interconnected by a conduit 68.

A portion of the fuel entering the chamber 55 passes thru restriction 56, chamber 54, conduit 68, chamber 40, passages 49 and 48, chamber 41, and conduit 67 to the chamber 63 in the pressure regulator 36. The quantity of fuel flowing along this path is controlled by the position of valve 45 with respect to the seat 47.

It may be seen that upon an increase in the quantity of air flowing thru the passage 13, the pressure differential between chambers 21 and 24 is increased, thereby causing a movement of valve 45 to the left, to increasingly restrict the passage between members 40 and 41. This increases the pressure in chamber 40, which increase is transmitted thru conduit 68 to chamber 54 in the fuel regulator 32, thereby causing a movement of valve 57 in an opening direction. This increases the quantity of fuel going thru the valve 57 and the metering restriction 34 to the discharge nozzle 15, to match the increased quantity of air entering the carburetor.

The pressure regulator 36 operates to maintain a substantially constant pressure on the downstream side of the metering restriction 34. The chamber 64 is vented thru a conduit 70 to the vent ring 18 to permit easy movement of diaphragm 62. The pressure in chamber 63 and the force of spring 66 are large compared to the pressure in chamber 64, and the latter pressure therefore has little or no effect on the position of valve 65. However, variations in the pressure in chamber 63 which may occur due to changes in atmospheric pressure in chamber 64 or from other causes, are balanced by the action of the pressure meter 22. Changes in pressure in chamber 63 are transmitted to chamber 41 of pressure meter 22, thereby moving valve 45 and causing a parallel change in pressure in chamber 40 of pressure meter 22 and in chamber 54 of fuel regulator 32, so that a balancing change is produced in the pressure upstream from the metering restriction 34. The pressure differential across metering restriction 34 is therefore not disturbed, and the quantity of fuel flowing thru the carburetor is not affected by a change in the pressure in chamber 63.

In the pressure meter 22, it may be seen that the diaphragm 44 acts to move the valve 45 to the left since the pressure in chamber 21 is always higher than the pressure in chamber 24. On the other hand, the diaphragm 42 always acts to move the valve 45 to the right, since the pressure in chamber 40 is always higher than the pressure in chamber 41. The valve member 45 and the cable 51 are therefore always maintained under tension. This tensioning effect prevents a binding action between the valve 45 and the guide 47, such as might occur if the valve member 45 were acted on by two opposing compressive forces.

If two opposing forces acting at opposite ends of an elongated member so as to stress the member in compression are slightly eccentric, they constitute a couple tending to rotate the member in a direction to increase the moment arm of the couple. If, on the other hand, the two opposing eccentric forces act so as to place the member in tension, the resulting couple tends to rotate the member in a direction to decrease the moment arm of the couple. Where the member in question is guided, as in the case of the valve 45 in the present construction, its rotation by such a couple is limited by a reactive couple acting thru the walls of the guide. Altho the rotation of the valve 45 by such eccentric forces in the present construction could be only a very small amount, nevertheless there would be some rotation. In a given device, the moment arm of the reactive couple is fixed by the dimensions of the guide, while the moment arm of the couple applied to the ends of the valve is greater if the member is in compression than if it is in tension. It follows that the forces of the reactive couple must be greater if the member is in compression. If these forces, which hold the valve against the guide, are greater, then there is a greater tendency for the valve to bind or stick. Therefore, an arrangement such as that illustrated provides a distinct advantage over devices of the type where the member connecting the diaphragms is in compression.

Furthermore, by the use of the flexible cable 51, any force which acts laterally (vertically, in the position shown in the drawing) on the diaphragm 44 or its supporting disks cannot be transmitted to the valve 45 to hold the latter against the guide.

It should also be noted that since diaphragm 44 is made larger than the diaphragm 42, a given air pressure differential balances a larger fuel pressure differential in the pressure meter 22. By virtue of this construction, it is possible to use a higher pressure differential across the metering restriction 34, and hence a wider range of pressure differentials, permitting more accurate control of the fuel flow, is available.

While I have shown and described a preferred embodiment of my invention, other modifications thereof will readily occur to those skilled in the art, and I therefore intend my invention to be limited only by the appended claim.

I claim as my invention:

A carburetor for an internal combustion engine, comprising in combination, a first conduit for conveying air for combustion purposes to said engine, a venturi in said first conduit for producing two unequal pressures therein whose difference is a measure of the rate of air flow therethru, a source of fluid fuel under superatmospheric pressure, a second conduit for conveying fuel from said source to said engine, a metering restriction in said second conduit, means for regulating the fuel pressure in said second conduit at the discharge side of said restriction, first valve means for controlling the fuel pressure on the intake side of said restriction and thereby controlling the flow of fuel therethru, means for operating said first valve means including a third conduit for by-passing fuel from said source around said restriction to said fuel pressure regulating means, said third conduit including a restriction, an expansible chamber having a movable wall attached to said first valve means for positioning the same, and second valve means for controlling the flow of fluid thru said third conduit and thereby the pressure in said chamber and the position of said first valve means, and operating means for said second valve means comprising two pairs of expansible chambers, two flexible diaphragms, each separating one of said pairs of chambers, one of said diaphragms having a greater area than the second, means for conveying air at said two unequal pressures to the two chambers separated by said one diaphragm, means subjecting the two chambers separated by said second diaphragm to the fuel pressures upstream and downstream from said second valve means, means for connecting the two diaphragms and extending between the high pressure sides thereof including a tubular member which passes thru said second diaphragm to establish fluid communication between the opposite sides thereof, a stationary guide and seat member apertured for the passage of said tubular member therethru, and a port in said tubular member adjacent said seat member, said tubular member, said stationary member and said port comprising said second valve means.

STANLEY W. GILBERT.